United States Patent [19]

Taylor et al.

[11] 4,286,291

[45] Aug. 25, 1981

[54] DIGITAL VIDEO PROCESSOR

[75] Inventors: Richard J. Taylor, London, England; Phillip P. Bennett, Foster City, Calif.

[73] Assignee: Micro Consultants Limited, Berkshire, England

[21] Appl. No.: 128,709

[22] Filed: Mar. 10, 1980

[30] Foreign Application Priority Data

Mar. 22, 1979 [GB] United Kingdom ............... 10113/79
Nov. 9, 1979 [GB] United Kingdom ............... 38847/79

[51] Int. Cl.³ .............................................. H04N 7/00
[52] U.S. Cl. ..................................... 358/138; 358/13
[58] Field of Search ................. 358/12, 160, 133, 138, 358/13, 180; 360/33, 39

[56] References Cited

U.S. PATENT DOCUMENTS 3,299,204   1/1967   Cherry et al. .................... 358/138
4,204,227   5/1980   Gurley ............................. 358/138

Primary Examiner—Robert L. Richardson
Attorney, Agent, or Firm—Dowell & Dowell

[57] ABSTRACT

A digital video processor system adapted to reduce the number of digital data samples by effectively reducing the data rate to allow more efficient handling during any further manipulation. The processor includes a separator for separating data from spacially adjacent video lines into high and low frequency components and adders for adding the high frequency component from each line and adding this summed data to selected portions of the low frequency component to produce data reduction by a factor of two. The data after further manipulation can be reconstituted by similar techniques.

12 Claims, 21 Drawing Figures

X = 4 fsc samples
O = 2 fsc samples

DIGITAL VIDEO PROCESSOR

BACKGROUND TO THE INVENTION

The invention concerns digital still picture storage and also concerns aspects of digital picture processing suitable for use in a digital picture library system.

It is known to store still pictures (e.g. photographic slides) by using a television camera to convert the still photograph into a standard television format which is then stored on a suitable storage medium. Such an electronic still storage system is described in U.K. patent application No. 7928615 (35220/78) which uses a video tape recorder (VTR) to store the still picture frame and which frame is stored several times on the tape. On retrieval the storage system integrates the picture frame by frame to provide an output which appears undegraded regardless of shortcomings in the storage medium itself.

OBJECT OF THE INVENTION

The present invention is concerned with providing an improved storage system and/or digital processing suitable for use in such a storage system.

SUMMARY OF THE INVENTION

According to the invention there is provided a digital video processor system for reducing the number of digital data samples relative to that received at an input thereof by effectively reducing the data sample rate comprising input processor means including a separator for receiving digital video data from spacially adjacent video lines and separating said data into high and low frequency components, a first adder for adding together the high frequency component from each line, and a second adder for adding selected portions of the video data from said first adder to selected portions of the low frequency component to provide the reduction in data therefrom by a factor of two.

Output processing means are preferably provided after additional manipulation to reconstitute the data into the original format.

Further according to the invention there is provided a method of reducing the number of digital data samples by effectively reducing the data sample rate comprising receiving video data from two spacially adjacent video lines, separating the received data from each line into high and low frequency components, adding together the high frequency component from each line, selecting portions of the video data from the first adding step, selecting portions of the low frequency component of the video data, and adding the selected portions of the data from the first adding step to the selected portions of the low frequency component to provide the reduction in data therefrom by a factor of two relative to that received.

DESCRIPTION OF PREFERRED EMBODIMENTS

Figure 1:
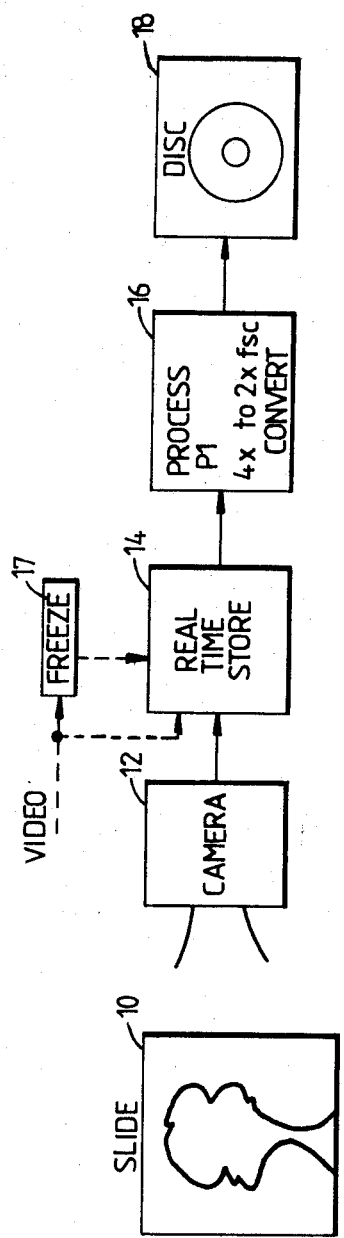
FIG. 1 shows the basic record system.

In the arrangement of FIG. 1 the recording system includes a camera 12 for receiving an image of slide 10. The camera output is received by real time store 14. The digital data for the store is received at 4 times subcarrier sampling rate (via a decoder and an ADC as necessary) from the camera. The data from store 14 is accessed by digital processor 16 in non-real time and this processor converts the 4×fsc sampling to 2×fsc. The processor output is received and stored on disc 18 for example which provides non-real time storage.

Thus, during the recording process in which data is entered to the still store from a video signal source, the digital storage takes place at two levels, namely the real time level in the solid state store 14 and the non-real time level in the disc store 18.

In the present embodiment, use has been made of a four-times colour sub-carrier sampling signal to effect the basic conversion from analogue into digital form and initial storage at the real time stage. This analogue to digital conversion is a standard technique, which is used in many digital television systems employing conversion and storage.

The contents of the real time store are transferred to disc where the capacity is limited and data compression desirable. In this system use is made of a process (described in more detail below) to convert from four times colour sub-carrier sampling to two times colour subcarrier sampling in making the transfer between real time and non-real time.

The conversion system 16 has been designed so that it operates in the non-real time area, which allows considerable simplification of circuitry as very high speed operation is no longer required. At the same time, the digital filter function may be more easily implemented to its optimum characteristic.

Whilst the conversion process between four times and two times colour sub-carrier sampling is in effect a digital filter function, and types of digital filtering are known, the provision of a conversion process in a non-real time circuit rather than the known real time arrangements, its construction and application to an electronic still store or digital library system, is believed novel and in addition because of its non-real time operation it is constructed more simply yet can work to an optimum, as is its use of spacially adjacent lines.

Figure 2:
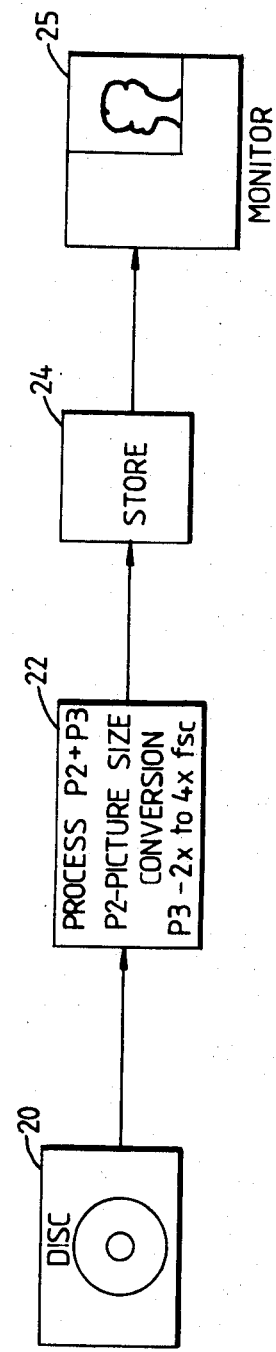
FIG. 2 shows the basic playback system.

A major enhancement has also been made to the system during the replay operation as shown in FIG. 2. The output from disc 20 is received by non-real time processor 22 which converts the data from 2 fsc to 4 fsc prior to receipt by real time store 24. The system is also capable of manipulating the data to provide picture reduction or enlargement as described below. The store data is read out at normal rate for displaying on a monitor 25 for example having first been converted into analogue form in a DAC and encoded as necessary.

Thus, during this replay mode, data is transferred from the disc into the real time solid state store through a processing path. The function of the processing path is to provide a conversion from two times to four times colour sub-carrier coding—being the inverse of the function described above—so that the real time store contains the same type of coded data originally entered. In this system, the processing path is again placed in the non-real time area, so that the filter function required can be implemented using slower speed and lower power consumption electronics.

An additional improvement and feature is concerned with the use of the non-time replay processor to create images which are expanded or reduced in size compared with the original stored picture on disc. The relative position within the normal frame can also be varied. This is in effect an electronic non-real time zoom system to allow pictures to be inserted into programmes such as news broadcasts via suitable switching. The system resembles the capabilities of an electronic slide scanner with a zoom lens. However, in the digital library system, it is possible to re-store the picture size in a compressed or enlarged form suitable for use in a sequence. Picture scroll can also be provided by manipulating the picture point addressing.

FIGS. 1 and 2 can be formed from a combined system where this shares the disc and real time stores when available or alternatively may be separate systems. The contents of the disc store may hold several hundred separate pictures and the problem of examining the contents of the store in order to find a picture you need exists. It has already been described in the aforementioned patent application No. 35220/78 to include identification data to identify a particular picture held in storage. In the expanded arrangement of FIG. 3, the system is under control of computer 27 in dependence on control data fed from video display and keyboard unit 30. Thus although control of the disc and processor 22 and store 24 could be realised using hardware (see U.S. Pat. No. 4,183,058 for example) it is convenient to use software control to achieve greater flexibility (see U.S. Pat. Nos. 4,148,070, 4,163,249 and 4,172,264 for example). One facility effected by this present arrangement is the facility to provide a matrix of miniature pictures displayed together on the screen. This 'browse facility' displays the contents of the store in a series of 'polyphoto' formats, whereupon up to a total of 64 miniature pictures are displayed at once on the CRT. It then becomes possible to look at 'pages' within the store.

A further feature which can be provided concerns the indexing mechanism.

In order to assemble a sequence of still pictures suitable for incorporation into a television programme, it is necessary to identify each of the photographs held within the library system by a number or code. The system can display the number superimposed on the shot by exercising a control function. By selecting a sequence of numbers, the user can put together his required sequence of pictures. In addition, however, by the provision of suitable software using standard techniques for example it is possible to cross-reference the contents of the store by a series of classifications. Typically these could include sports personalities; politicians; actors; fires; football matches; races. Each shot is designated a code number which allows the reviewer to recall a complete page of items coming under any of the classifications above, so for example, he may see a page of sports personalities from which to choose his shots.

By further expansion of the system to allow a sequence of two separate still pictures to be assembled into two separate digital stores in real time, a digital process can then be provided which allows cross-fading to occur from one to the other stores. The digital process can be provided by multiplying one digital video signal by a constant and the second digital video signal by one minus the same constant (as described below with reference to FIG. 19).

Although the picture library recording system of FIG. 1 has been considered as storing still pictures themselves taken from still pictures (e.g. slides) the system can be adapted to capture moving pictures and store these for future use.

When making a still shot from a moving shot, such as taking one particular 'clip' from a video tape, it is necessary to 'stop motion' between fields if a satisfactory still is to be produced. One known method of undertaking this process involves a single field recording system in which a repeated field sequence is used to generate 'stop motion'. The disadvantage of this system is that the vertical resolution is seriously degraded. In the present library system, a method of 'stop motion' is expediently used for capturing moving pictures (when the incoming video is not from a slide for example) and is shown by the freeze control block 17 for store 14, whereby motion detectors within freeze control 17 select parts of the picture which have remained stationary and record them as a two field sequence at full vertical resolution but inhibit the mechanism during motion, so that only single field reproduction from store 14 is used. Such a picture freeze system is described in U.K. patent application No. 35988/78.

Although the selection of a desired picture actually displayed in the case of a picture matrix 'page' or as one of a list of titles has been described as selected via the keyboard, it would also be possible to select desired pictures by use of a light pen, for example.

The above system will now be described in more detail with reference to FIG. 4. Incoming video which may be from a still or moving picture (asynchronous to the system reference signals or not) is passed to analogue to digital converter (ADC) 13 if not already in digital form. The ADC output is typically in 8 bit form at a rate of 4×fsc and this data is written into the frame store 14 under the control of sequencer 15 using normal techniques. The read out of the captured frame from the store 14 (because of its asynchronous capability) can be at a slower data rate which is compatible with the rest of the system (typically 2 M Byte/sec). The data read out is processed by converter 16 which converts the data from 4 to 2×fsc so as to output data at a rate of 1 M Byte/sec. The converter 16 is primarily provided to reduce the amount of information made available to disc control 18 by exploiting the redundancy on the T.V. signal thus effectively increasing the packing density. The read out from store 14 and write in for disc 18 is under the control of sequencer 19. Thus the system is capable of providing 4 to 2 times conversion at the read side of the store at the data rate compatible with the disc rather than the normal video data rate. Thus whereas typically a 14.3 M Hz data rate would be required before the store, only a 2 M Hz rate is required after the store.

Figure 3:
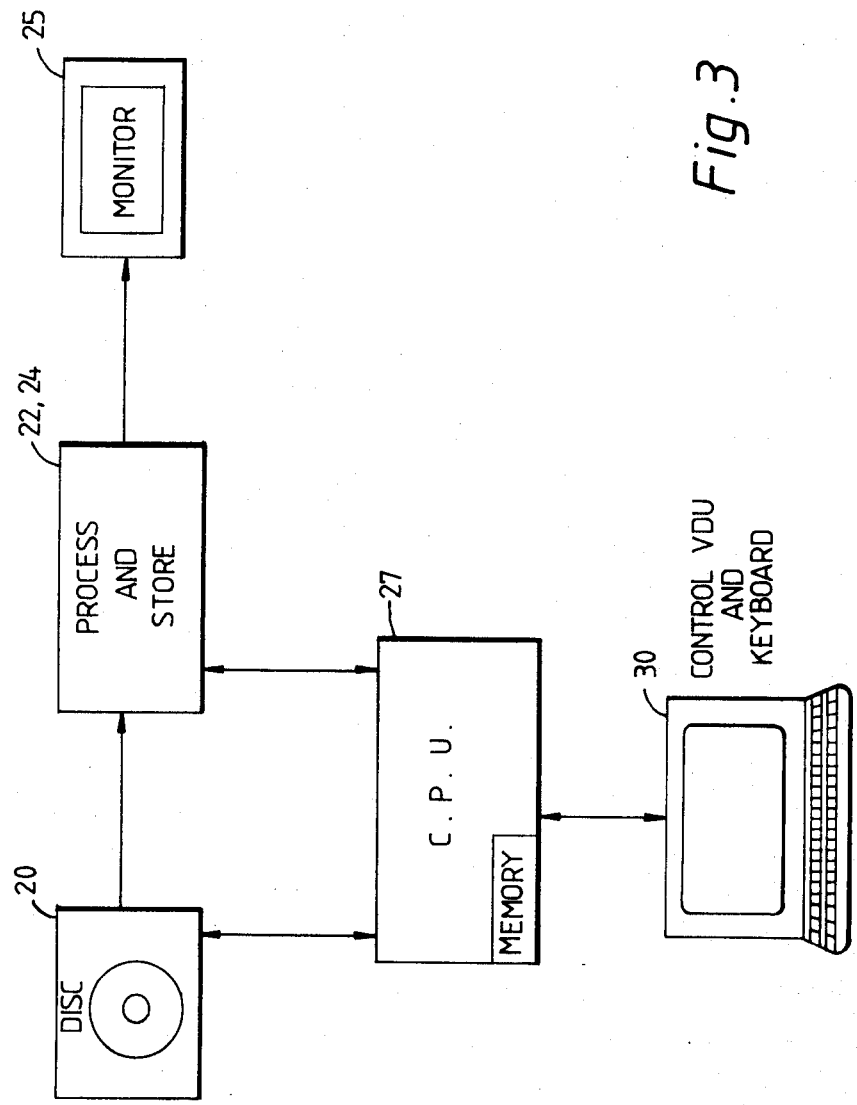
FIG. 3 shows the playback system under computer control.

Sequencer 19 can be formed to be under the control of the computer system 27 and 30 of FIG. 3.

Figure 5:
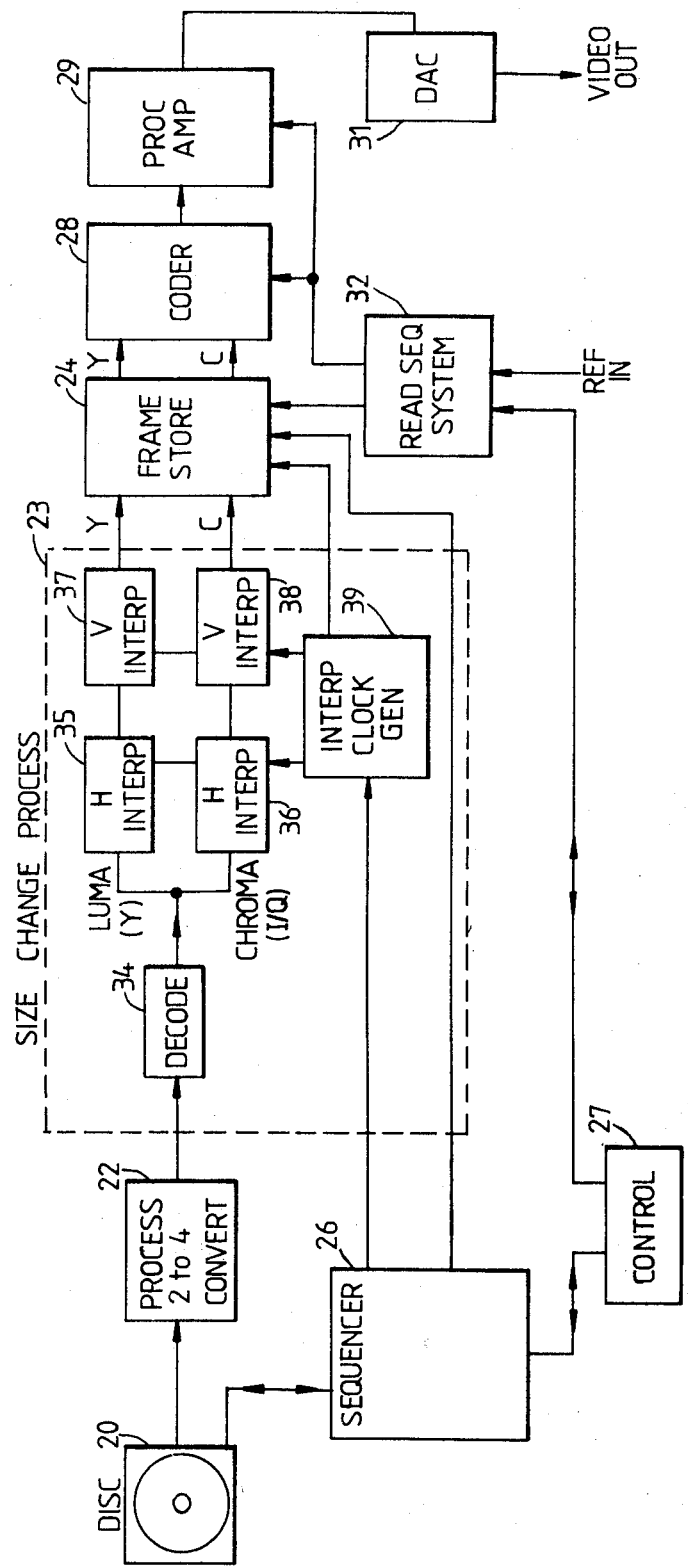
FIG. 5 shows an embodiment of the basic playback system in more detail together with the facility for picture size change.

The FIG. 5 arrangement shows an example of the FIG. 2 replay configuration together with processing to allow the picture size to be altered.

The picture data stored on disc unit 20 (which could alternatively be the drive unit 18) is output at the data rate compatible with the disc drive, typically 1 M Byte/sec. The processor 22 converts the data from 2 to 4×fsc to reconstitute the data to the form originally produced in the record system prior to processing. The data at a rate of 2 M Byte/sec is made available to size change processor 23 which can alter the size of the desired picture taking into account sequencing information from sequencer 26 as described in more detail below. Basically the video data is decoded into its digital luminance and chrominance components by decoder 34 and the luminance (Y) and chrominance (I/Q) are processed in separate horizontal intepolators 35, 36 and vertical interpolators 37,38 under the control of interpolating clock generator 39. The interpolating clock generator 39 decides how big a picture size has been chosen and what samples (and their percentages from various samples) are required for a particular compression size, for example. By providing processor 23 in a position to receive data at the relatively slow rate provided from the disc it is possible to provide sophisticated digital processing throughout to achieve size change without degradation problems.

Sequencers 26 and 32 can be controlled for example by computer system 27 and 30 of FIG. 3.

The processed video data is received by frame store 24 which data is still in its separated components. The frame store allows the data to be input at the slower disc rate (typically 2 M Byte/sec) under the control of sequencer 26 and generator 46, and read out at the faster video rate (say 14.3 M Hz) under the control of a read sequencer 32 locked to standard reference signals. The sequencer also provides control inputs to a coder 28 which recodes the video data into composite format which passes to process amplifier 29 also under the control of sequencer 32. The output digital video is converted into analog form as desired by converter 31. By providing the coder 28 after the frame store the need for a chroma inverter is removed thus avoiding problems associated with chroma flicker. In the basic system the size change processing could be omitted so that the FIG. 5 arrangement would correspond more simply to the reverse of the FIG. 4 arrangement.

Figure 4:
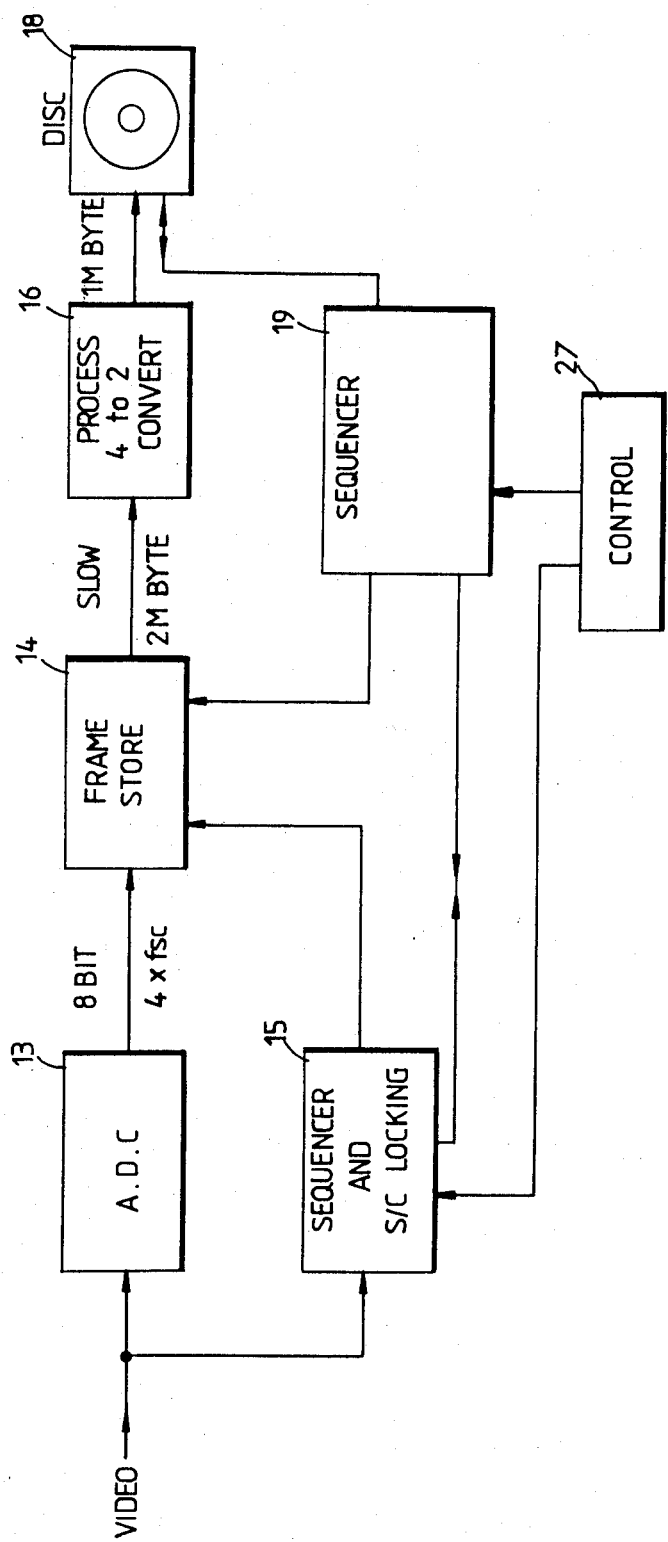
FIG. 4 shows an embodiment of the basic record system in more detail.

Although FIGS. 4 and 5 are shown as separate systems some elements including the frame store could be shared.

Figure 6:
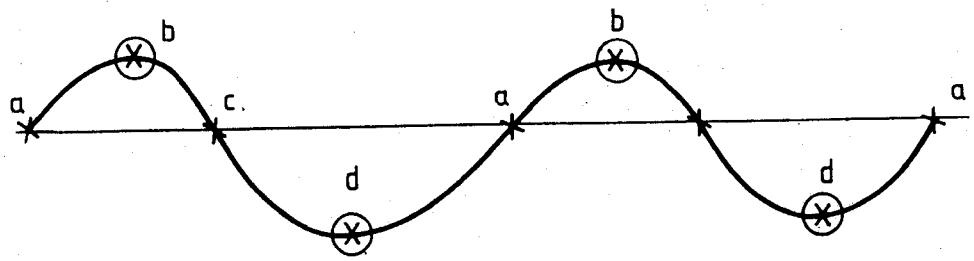
FIG. 6 shows the requirement for 4 fsc and 2 fsc sampling.
Figure 7:
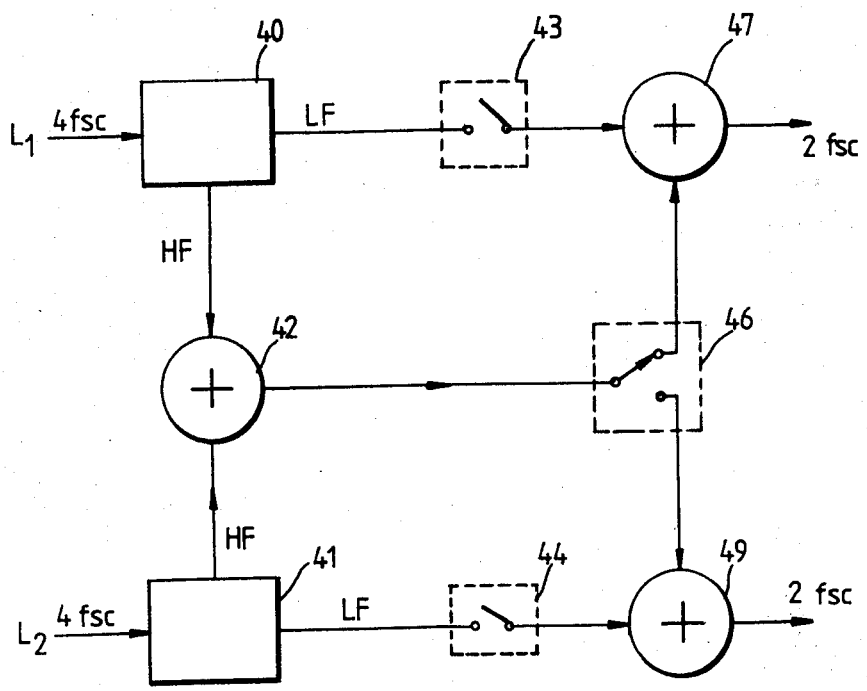
FIG. 7 shows one embodiment suitable for converting 4 fsc samples to 2 fsc.

The converter mechanism of block 16 of FIG. 4 is now described with relation to FIGS. 3 and 7. The subcarrier waveform shown in FIG. 6 is shown with samples at points X at a rate of 4 times per cycle (4 fsc). In order to reduce the sampling rate whilst maintaining the desired data, sampling at points O is shown which corresponds to a rate of 2 fsc. Had the reduced number of sampling points been chosen along the axis then the data would have been invalid. This is only a problem with high frequency portions of the video data.

Figure 8:
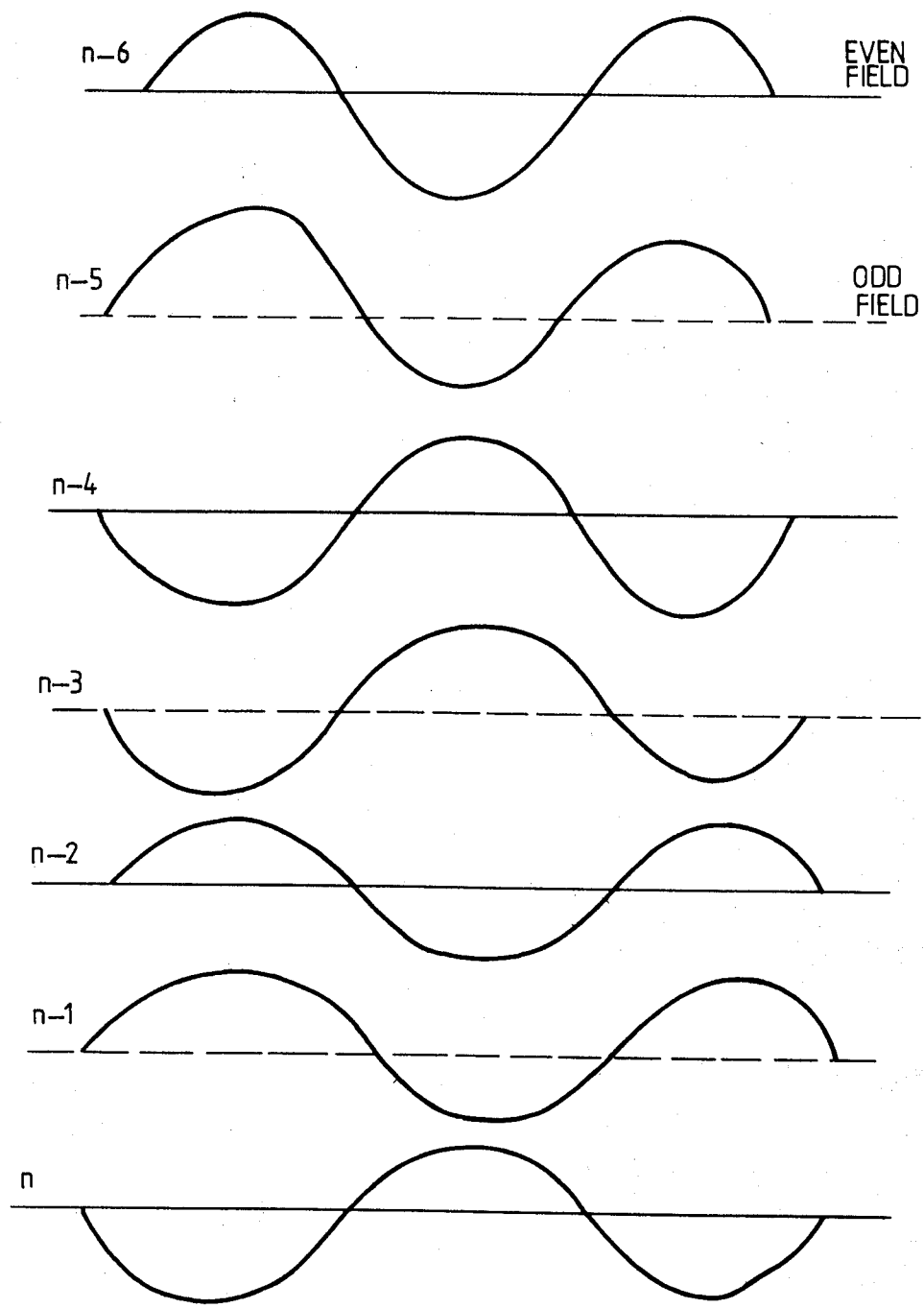
FIG. 8 shows the subcarrier phase relationship between various picture lines.

A system capable of providing the 2 to 4 fsc conversion is shown in FIG. 7. In practice converter 16 receives video data from two lines $L_1$ and $L_2$ to provide the conversion process. Because the picture data is stationary (captured by frame store 14 if moving) the lines need not be from the same field as explained with reference to FIG. 8. Lines n-6 to n represent consecutive lines on a frame of video information, the solid and broken lines representing even and odd fields respectively. Due to the phase relationship of the analogue signals it can be seen for example that lines n-4 and n-3 are compatible but only if the picture is not moving otherwise movement errors due to changes in the fields may occur. Thus in prior arrangements where attempts have been made to use information from two lines it has been necessary to use lines n-4 and n for example as these are the two closest lines of correct phase relationship from the same field, to avoid any picture degradation due to movement. In the present system, due to the stationary image, use can be made of adjacent lines n-4 and n-3 and by providing the processor with reduced data rate (as determined by the read out rate from the store 14 of FIG. 4) a suitable converter can be realised.

Returning to FIG. 7, taking $L_1$ as the line which is to be coded from 4 to 2 fsc then information from line $L_2$ is also used, this line being below $L_1$ when processing a line from the first field and from above when coding a line from the alternate field.

The data for $L_1$ is received by filter 40 which separates the video into high and low frequency data. The high frequency data at 4 fsc passes to adder 42 which also receives high frequency data from filter 41 relating to $L_2$. The low frequency data at 4 fsc from the respective filters 40 and 41 pass via switches 43 and 44 to adders 47 or 49. These switches are arranged to close so as to only pass on every other sample to the adders. Thus samples a, b, c, d, for lines $L_1$ and $L_2$ will pass from filters 40 but due to switch 43 will reduce to samples b, d, and from filter 41 due to switch 44 will pass only a, c. Thus the data rate is reduced to 2 fsc. Adder 42 will produce the average of the high frequency data from the two lines and the 4 fsc rate will effectively be reduced by switch 46 which alternates between adders 47 and 49 such that samples b, d, b, d will pass to adder 47 and a, c, a, c, to adder 48. Thus the averaged high frequency data is added to the low frequency data and available at 2 fsc from the output of adder 47 (or 49).

Figure 9:
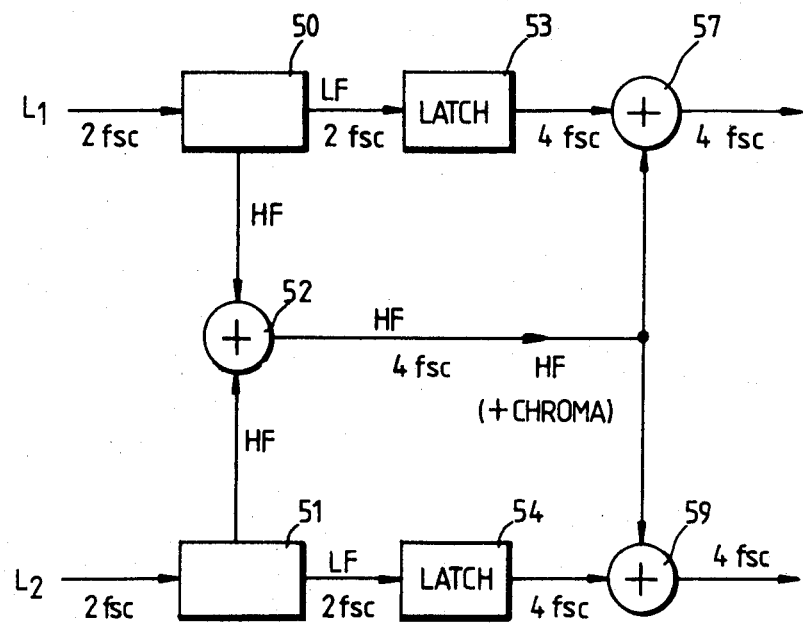
FIG. 9 shows one embodiment suitable for converting samples from 2 fsc to 4 fsc.

An arrangement for the processor 22 used on the replay system of FIG. 5 is shown in FIG. 9. Data at 2 fsc is applied to filters 50 and 51 respectively for lines $L_1$ and $L_2$. The low frequency data is received by latches 53 and 54 respectively and the high frequency data is received by adder 52 which merges these samples for the two lines. As each of these will contain different samples at 2 fsc, when merged the result will be samples at a rate of 4 fsc. The latches 53 and 54 effectively hold the data to enable the samples to be repeated so that again data to adders 57 and 59 are provided at 4 fsc. Each of the latches could be replaced by using a low pass filter each having a delay in the increment of one ½ sample. In any event adder 57 adds the high and low frequency data to produce the 4 fsc video data stream for receipt by the converter 23 or possibly directly by the store 24 of FIG. 5.

Figure 10:
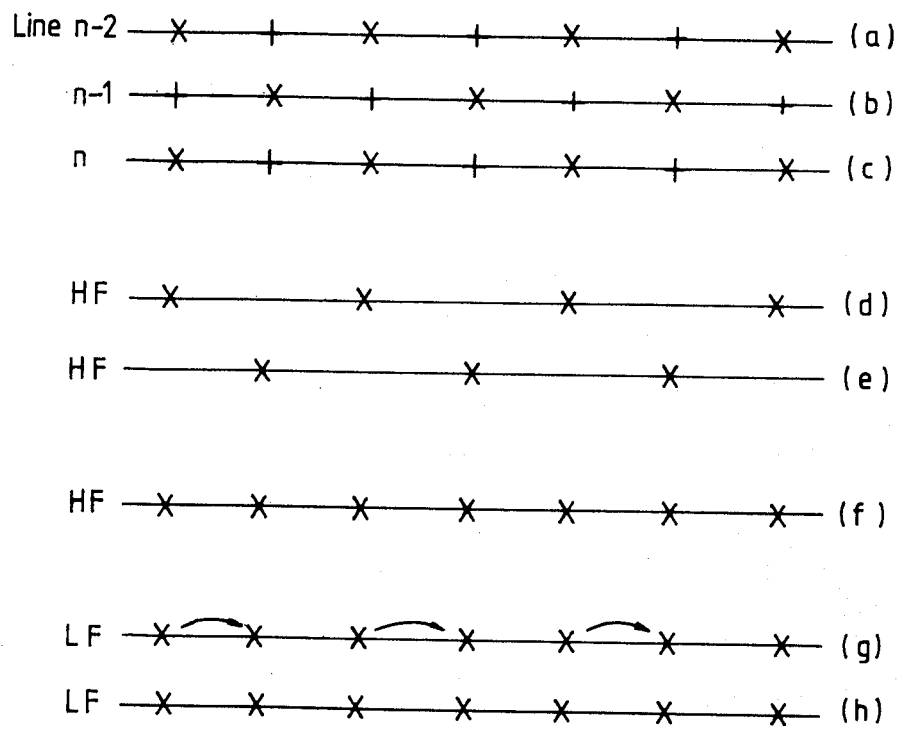
FIG. 10 shows the various stages in such conversion.

The way in which the samples are effectively manipulated through the conversion is represented by the FIG. 10 diagram. FIG. 10(a), (b) and (c) represent the samples along respective lines. Samples represented as X are retained and samples represented as + are lost in the 4 to 2 fsc conversion of FIG. 7. The HF sample data at 2 fsc, see (d) and (e), separated by filters 50 and 51 of FIG. 9 are combined in adder 52 to provide the HF sample data (see (f)) at 4 fsc. The LF sample data separated by filter 50 (say) is held by latch 53 so as to repeat (see (g)), thus providing 4 fsc samples as shown in (h).

Figure 11:
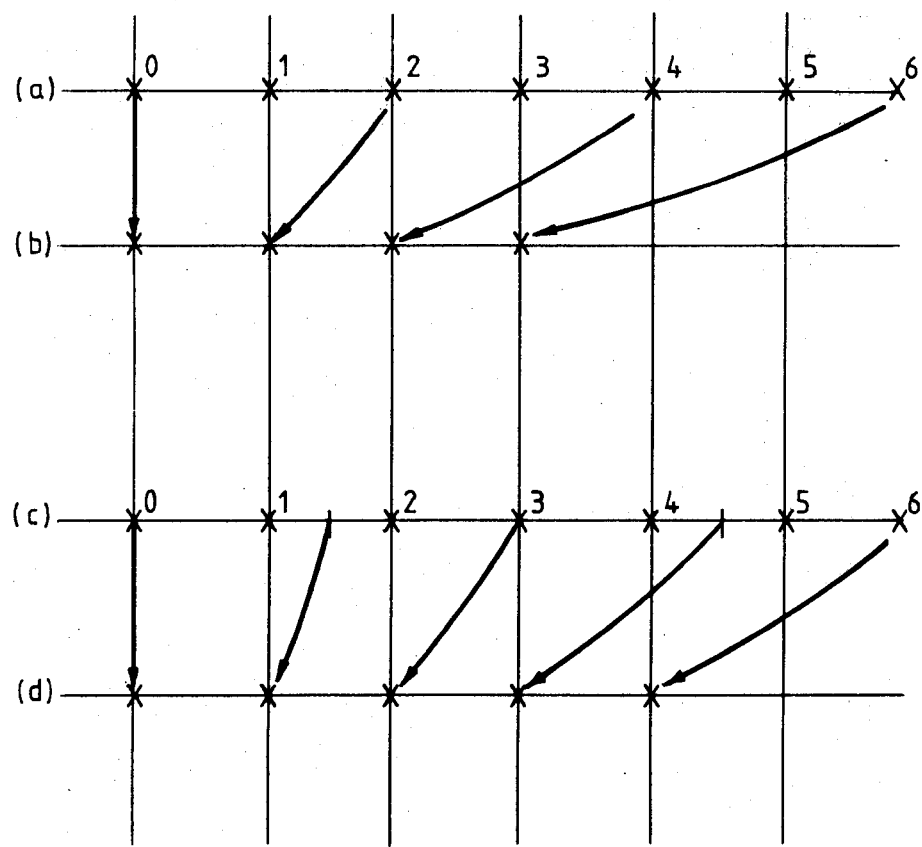
FIG. 11 shows various components of picture size change in dependence on the size selected.

The picture size processor 23 of FIG. 5 will now be described in more detail. As already explained, the video data is decoded into luminance and chrominance components by means of decoder 34 and passes to horizontal interpolators 35 and 36 and vertical interpolators 37 and 38 respectively. The interpolators comprise low pass filters which filter the incoming digital data to prevent violation of the sampling laws at reduced picture sizes. Additionally they can produce synthetic samples in between the original input points by producing filtering with non-integer group delays. The operation of the interpolators is controlled by the interpolating clock generator 39 which ties together the input sampling with the desired number of samples required to constitute the reduced size picture (i.e. to produce the desired ratio between them to track with a required picture size). Thus looking at the representation in FIG. 11 the number of samples along a particular line will be fixed for the incoming (uncompressed) picture as respective picture points. For a compressed picture the number of picture points required to be output will be less. Taking the situation where a half size picture is required then ½ the number of samples in 11(a) can be used to constitute the desired samples of 11(b). This covers compression in the horizontal direction. Vertically the mechanism is similar. In the situation where rather than 2:1 compression is required a reduction of say 1.5:1 is chosen then the requirement is not merely to select a sample but to interpolate samples nearest to a desired position, if a degraded picture is to be avoided.

This can be represented by 11(c) and 11(d) which respectively show incoming samples and outgoing samples. In the basic situation, the outgoing samples can be synthesised by data from the two 'nearest' original samples, the percentages of each sample being chosen in dependence on how near these samples are to the desired output sample position. Again only the horizontal compression is considered. In practice however, it has been found that rather than using just picture point data from the nearest picture point on either side use can be made of data from several picture points on either side, the percentage of the data actually used from each picture point being less the further the picture points are away from the proposed position.

Figure 12:
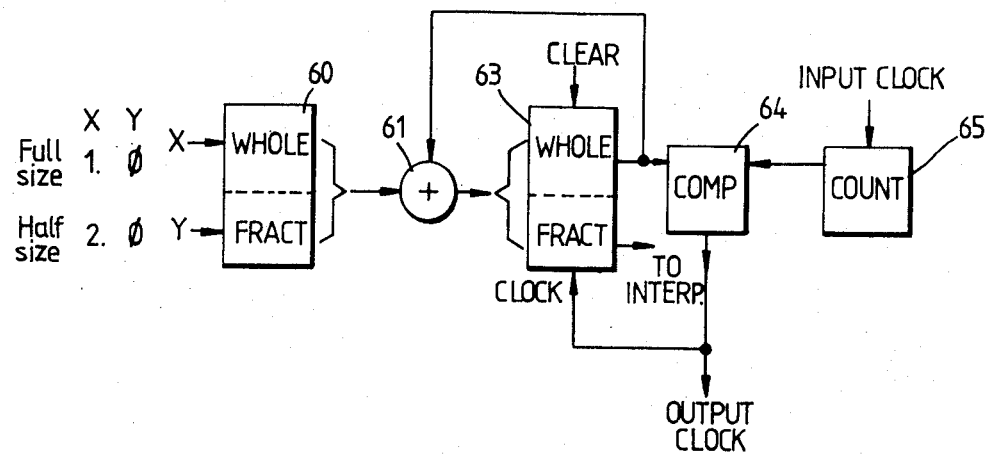
FIG. 12 shows in more detail the interpolating clock generator calculation function for retention of samples for size change.

A way in which the interpolating clock generator can control this synthesis is now described with relation to FIG. 12. Compression data is made available from control 27 of FIG. 5. A latch 60 receives data X and Y indicative of the desired degree of compression, via sequencer 26 of FIG. 5. Thus for a full size picture $X=1$ and $Y=0$; for a half size picture $X=2$ and $Y=0$ and so on. The upper half of the latch receives whole sample data (i.e. 1, 2 etc) and the lower half the fractional sample data as explained in more detail below.

The latch output is received by adder 61 which has as its second input the output of a further latch 63. This latch 63 receives the adder output and is cleared at the start of each line and receives clocks derived from the output of comparator 64. Comparator 64 compares the output of counter 65 with the output of latch 63. Counter 65 counts how many picture points have occurred and this denotes which picture point is present at any time and comparator 64 decides whether this picture point is required for interpolation as now explained. In the situation where a full size picture is required then latch 60 is set to 1.0 at the start of the line and latch 63 and counter 65 are cleared. During the first computation cycle at picture point 0 we have 0 into both sides of the comparator thus producing a high (1) output denoting a wanted sample. At this time latch 63 is clocked. At this point the inputs to adder 61 comprise 1.0 from latch 60 and zero from latch 63 thus the output from adder 61 comprises 1.0 which is entered into latch 63. During the next computation for the second picture point, at picture point 1 there will be 1.0 on either side of comparator 64 and thus a true (1) output therefore indicative that this picture point is required. At the same time latch 63 is clocked and an input of 2.0 is entered from adder 61 (made up of 1.0 from latch 60 and 1.0 from latch 63). This process is repeated for each input sample. When half size picture is required then latch input is set as 2.0 and at the start of the line latch 63 and counter 65 are cleared. At picture point 0 there is 0 on both sides of comparator and this gives a true out and latch 63 is clocked. At this point the input to adder 61 is 2.0 from latch 60 and 0.0 from the output of latch 63. Thus latch 63 once clocked contains 2.0. An output sample is generated in this cycle due to the comparator output.

During the next cycle at picture point 1 there is 2.0 from latch 63 present at one side of comparator 64 and 1 at the counter side. Thus comparator produces a false (0) output and therefore latch 63 is not clocked nor is an output sample generated.

In the third cycle, at picture point 2 then there is 2.0 present on both sides of comparator 64 and thus a true is produced clocking latch 63 and indicating that this sample is required. The input to latch 63 from adder 61 comprises 4.0 made up of 2.0 from latch 60 and 2.0 from the output of latch 63. This process repeats. At this time the interpolating filter (of FIG. 5) will have coefficients fed to it to produce a cut-off frequency of ½ the maximum in that direction.

When a size intermediate between ½ and full size is required then the fractional output portion of latch 63 comes into play as now explained. If we select a size such that the input to latch 60 comprises 1.5 i.e. $1+(1\times\frac{1}{2})$ then at the start of the line with latch 63 and counter 65 cleared, then at picture point 0 there is a zero at both sides of comparator 64 and a true output is produced clocking latch 63 and indicating that this sample is required. The input to latch 63 on clocking comprises 1.5 made up of 1.5 from latch 60 and 0.0 from latch 63.

In the second cycle at picture point 1 there will be at the input of comparator 64 a 1.0 from latch 63 (only the whole part is pertinent) and 1 from the counter 65. Thus comparator 64 gives a true out, therefore an output sample is generated and latch 63 is clocked with the output from adder 61 which is 3.0 made up of 1.5 from latch 60 and 1.5 from latch 63. The remainder (i.e. ½) from latch 63 is used in the interpolating filters of FIG. 5. The ½ effectively defines the position of the picture point to be synthesised relative the original picture points (in this case half way between picture points 1 and 2).

The interpolating clock generator of FIG. 12 is effectively duplicated to provide the entire clock system for both horizontal and vertical interpolation. Taking FIG. 12 as the horizontal interpolating clock generator, the counter 65 is clocked once per picture point. In the vertical generator, the operation will be at line rate, rather than picture point rate and the output clock will be used to gate the vertical interpolators on a line by line basis rather than on a picture point basis.

Figure 13:
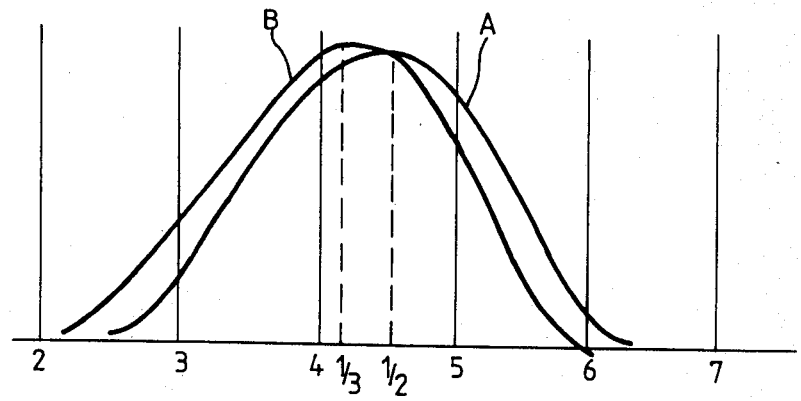
FIG. 13 shows a graphical representation of portions of picture points used for the synthesis.
Figure 14:
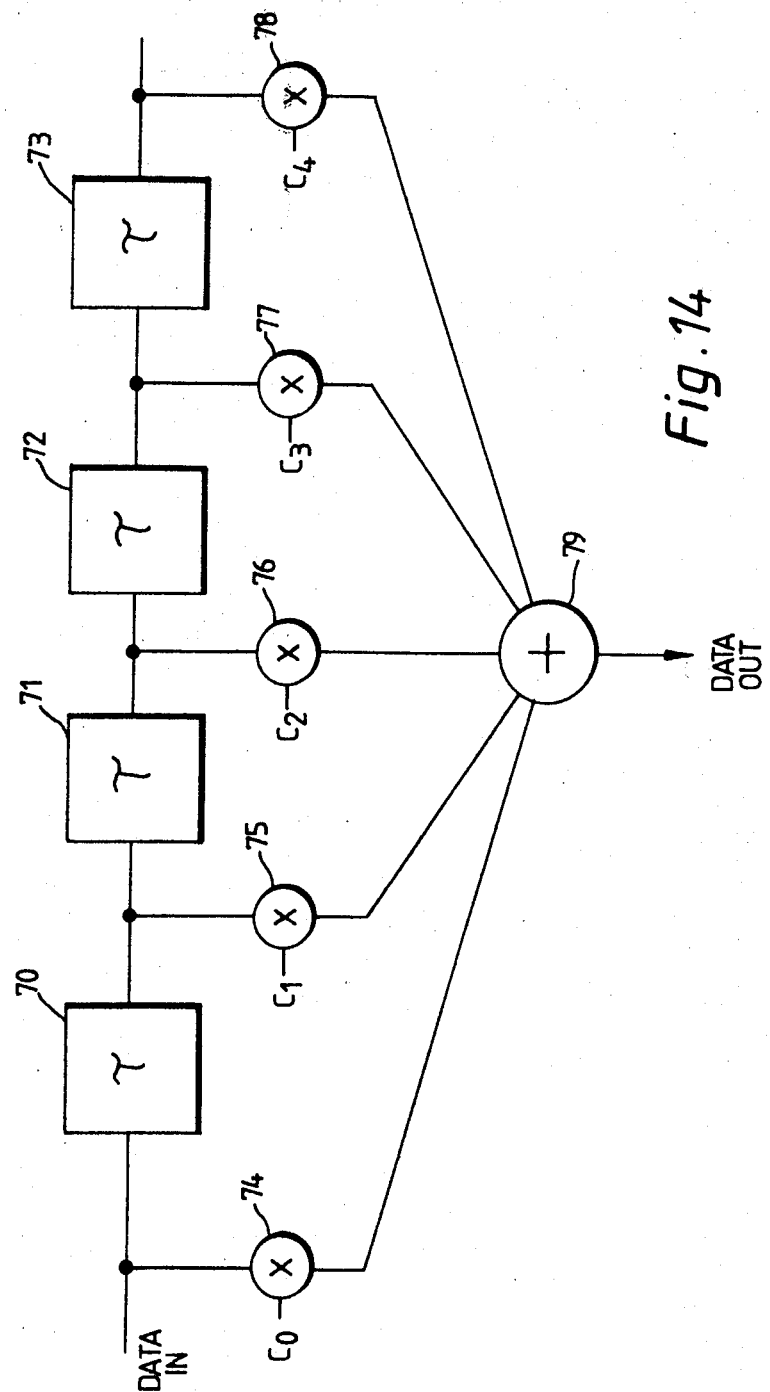
FIG. 14 shows the normal system used for dealing with the multiplication function.

In practice a picture point is synthesised from more than one original picture point on either side and may use for example portions from up to 8 picture points. The curve A of FIG. 13 represents the typical proportion of adjacent picture points used. Different portions in dependence on the calculated remainder may be used (as represented by curve B for when the remainder is ½). These percentages may be stored in a look up table (using a ROM or RAM for example) accessed in dependence on the calculated remainder. The portions of each picture point could be provided by using a number of digital multipliers each receiving a specific coefficient read out, the multiplier outputs being received by an adder to provide the synthetic picture point at its output as described in U.S. Pat. No. 4,163,249, and as now shown in the system of FIG. 14. Incoming picture point data passes via picture point delays 70–73 and each of the digital multipliers 74–78 is arranged to receive one of the five sequentially required picture point samples for multiplication by a selected coefficient $C_0$ and $C_4$ respectively. Although 5 picture points are shown as being processed, the number of multipliers and delays could be expanded to handle 8 picture points for example.

Figure 15:
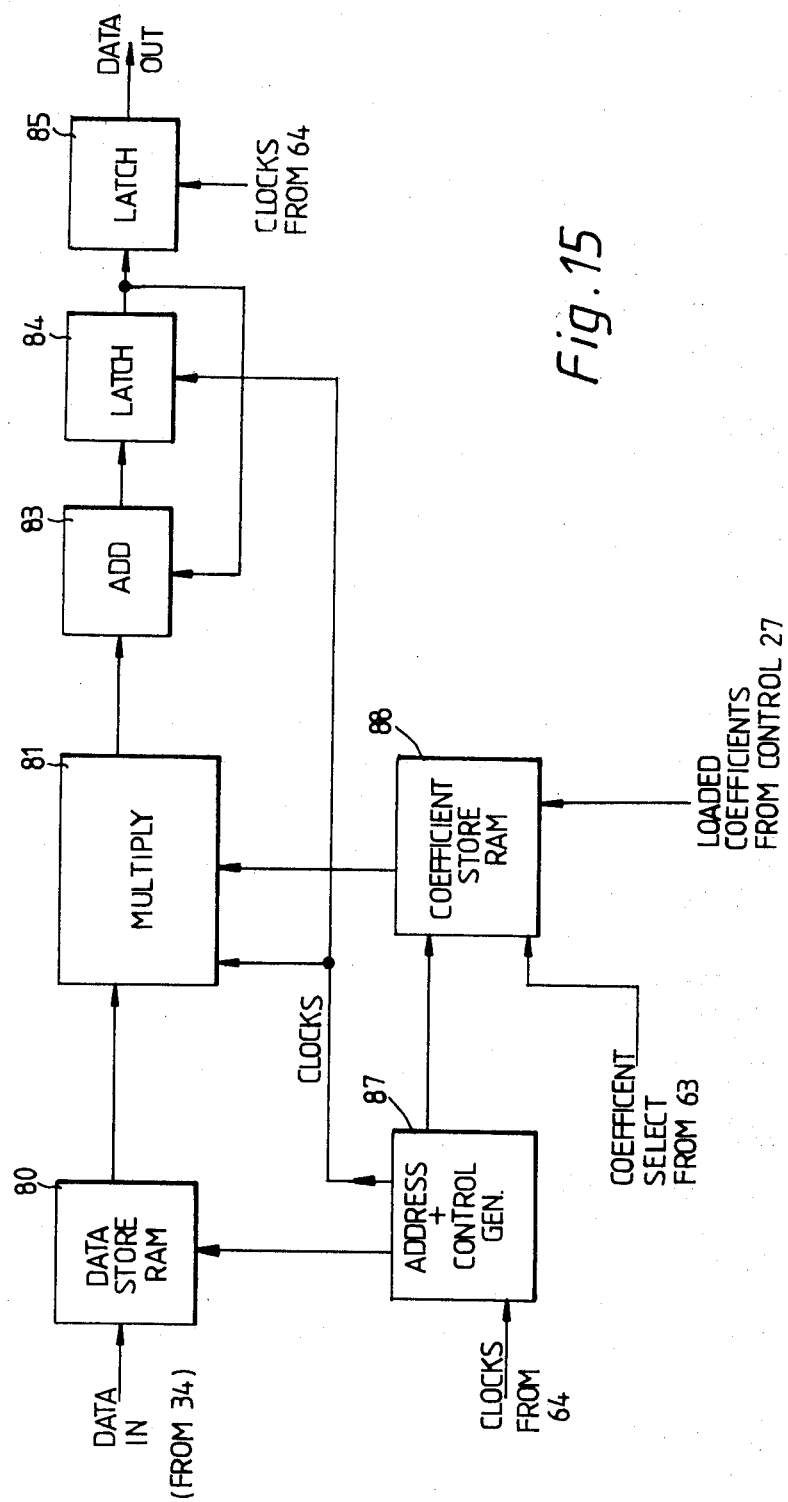
FIG. 15 shows an embodiment of the present system using a single multiplier for horizontal interpolation.

The multiplier outputs are received by adder 79 to give the processed output. In practice due to the relatively slow data rate (due to positioning the size change processing prior to the frame store 24 of FIG. 5) it is expedient to modify this known technique as now explained with regard to FIG. 15, so as to use a single multiplier multiplexed to handle the sequential data samples. Thus FIG. 15 shows a system suitable for one of the horizontal interpolators 35 or 36 of FIG. 5.

Data is received at the input to data store RAM 80 and desired samples are held by this store under the control of address and control generator 87 which itself receives clock pulses from the interpolating clock generator 39 of FIG. 5 (and more specifically from block 64 of FIG. 12). The data store 80 effectively holds a stack of data each from a picture point sample. This stack (say 8 samples) is sequentially made available under the address control 87 to the input of multiplier 81 where it is multiplied by a desired coefficient provided by coefficient store 88. The coefficient RAM will previously have been loaded by sets of coefficient from the computer control 27. These sets give a different group delay according to the remainder determined by the remainder calculated by the interpolating clock generator along the lines represented by FIG. 13, showing two possible curves. The coefficient selected in dependence on the output of latch 63 (of FIG. 12) used by the multiplier for that particular picture point. The multiplier output is accumulated with the previous multiplied data by means of adder 83 and latch 84. Because of the relatively slow data rate it is possible to accumulate and sum all the portions in the period between single input samples. Thus each data clock received by control 87 will cause the incoming sample to be entered into the data stack within RAM 80. Between clocks the data within store 80 is successively multiplied and accumulated 8 times, latch 84 being cleared to zero prior to the accumulation and clocked after each multiply (and add) step, under the control of generator 87.

The output available from latch 84 is selectively held by latch 85 under the control of a clock from interpolation generator 39. Thus dependent on the output from comparator 64 of FIG. 12 then if the sample synthesised is required then latch 85 is clocked and holds this sample for further use.

Figure 16:
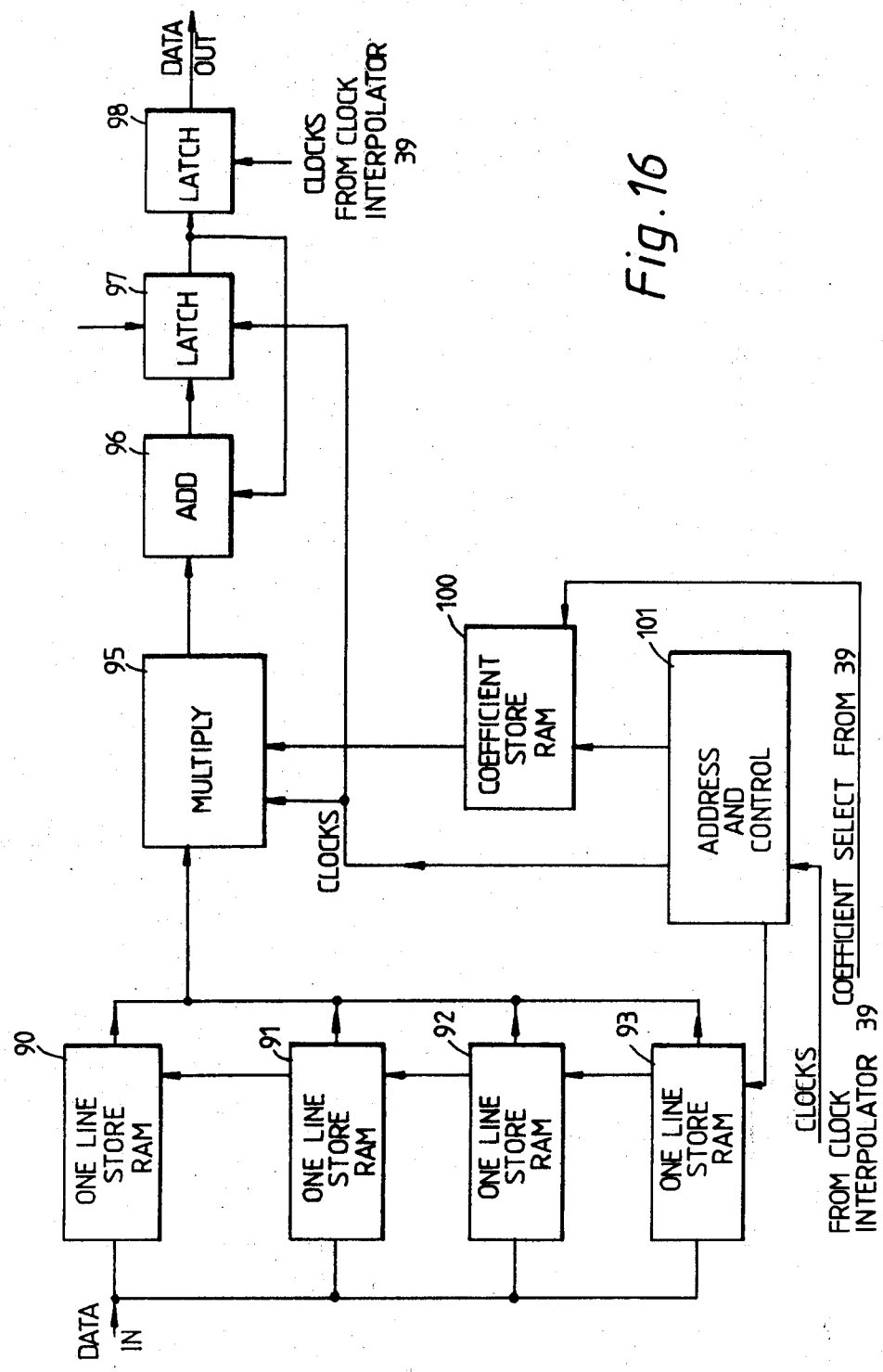
FIG. 16 shows an embodiment used for vertical interpolation.

To produce the vertical interpolators 37 and 38 of FIG. 5 a similar approach is adopted as shown in FIG. 16 except that one line stores are used rather than the requirement for storing single picture points. (Two such arrangements will be required to provide both interpolators 37 and 38.) Although only 4 one line stores 90–93 are shown these typically would be expanded to a capability of 8 lines of storage. The data for each of the lines is entered into the RAMS 90–93 under the control of block 101 and the desired samples (one from each line) are made available under this control to multiplier 95 which as before multiplies each sample by a coefficient held in coefficient store RAM 100 (previously entered via computer control 27 of FIG. 5). The multiplier is multiplexed to handle the samples and the successive processed samples are accumulated by adder 96 and latch 97. Any desired synthesised samples are held by latch 98 under the control of the clock from generator 39 as before. Thus each of the samples taken from a particular location along respective T.V. lines are multiplied and summed to produce a first synthesised sample. The next sample is synthesised by samples taken from the next location along the same T.V. lines, and so on. Each complete multiplication process is effected during the period between incoming samples, which samples will comprise incoming data from one of the lines to be processed. The line stores, as before, form a data stack which effectively is switched so that it is updated line by line, the earliest line in time being lost and replaced by current data.

The percentages of the picture points are determined in proportion to the calculated remainders in a similar way to the curves of FIG. 13 by interpolator 39.

Figure 17:
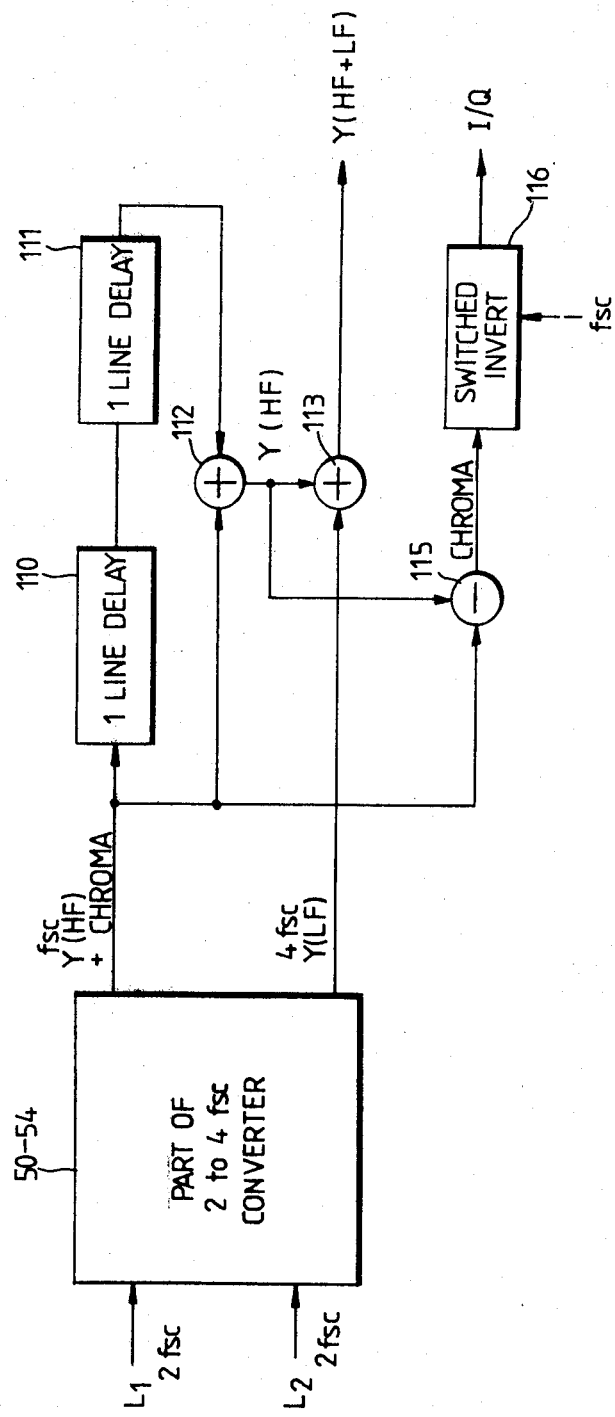
FIG. 17 shows an arrangement suitable for providing the decoder of FIG. 5.

Returning to FIG. 15, an arrangement suitable for the decoder 34 therein will now be described in more detail. As already explained in relation to FIG. 9, the 2 to 4 fsc converter can be realised using blocks 50–59. In practice, due to the processing steps carried out in the FIG. 6 arrangement, a decoder can be realised which makes use of some of these earlier steps as now described with reference to FIG. 17, so as to provide a combined converter and decoder.

Parts of the existing converter utilised (blocks 50–54 of FIG. 9) are shown on the left hand side of the present figure and two outputs are shown comprising luminance HF (+chroma) from adder 52 and luminance LF from latch 53. Two one line delays 110 and 111 are required so as to provide a delay corresponding to 1 line in the same field (e.g. if the output of delay 111 is line n−6 and the input to the first delay 110 is n−4, see FIG. 8). The current and delayed data is added in adder 112 so that effectively the chrominance component is cancelled, therefore the output from the adder is merely Y(HF). This output is added to the Y(LF) from the converter by means of adder 113 so as to provide reconstituted luminance (with LF and HF). The output from adder 112 is also received by subtractor 115 which provides chrominance only at its output.

This chrominance data is received by inverter 116 to switch chrominance (at fsc) so as to provide alternating chrominance sample by sample. Although chrominance and luminance separation using digital comb filtering is known, the present system employed in conjunction with, and following, the 2 to 4 fsc converter is believed novel. The output of adder 113 comprising the luminance data is passed to interpolator block 35 of FIG. 5 and the chrominance from inverter 116 is passed to interpolator block 36.

Figure 18:
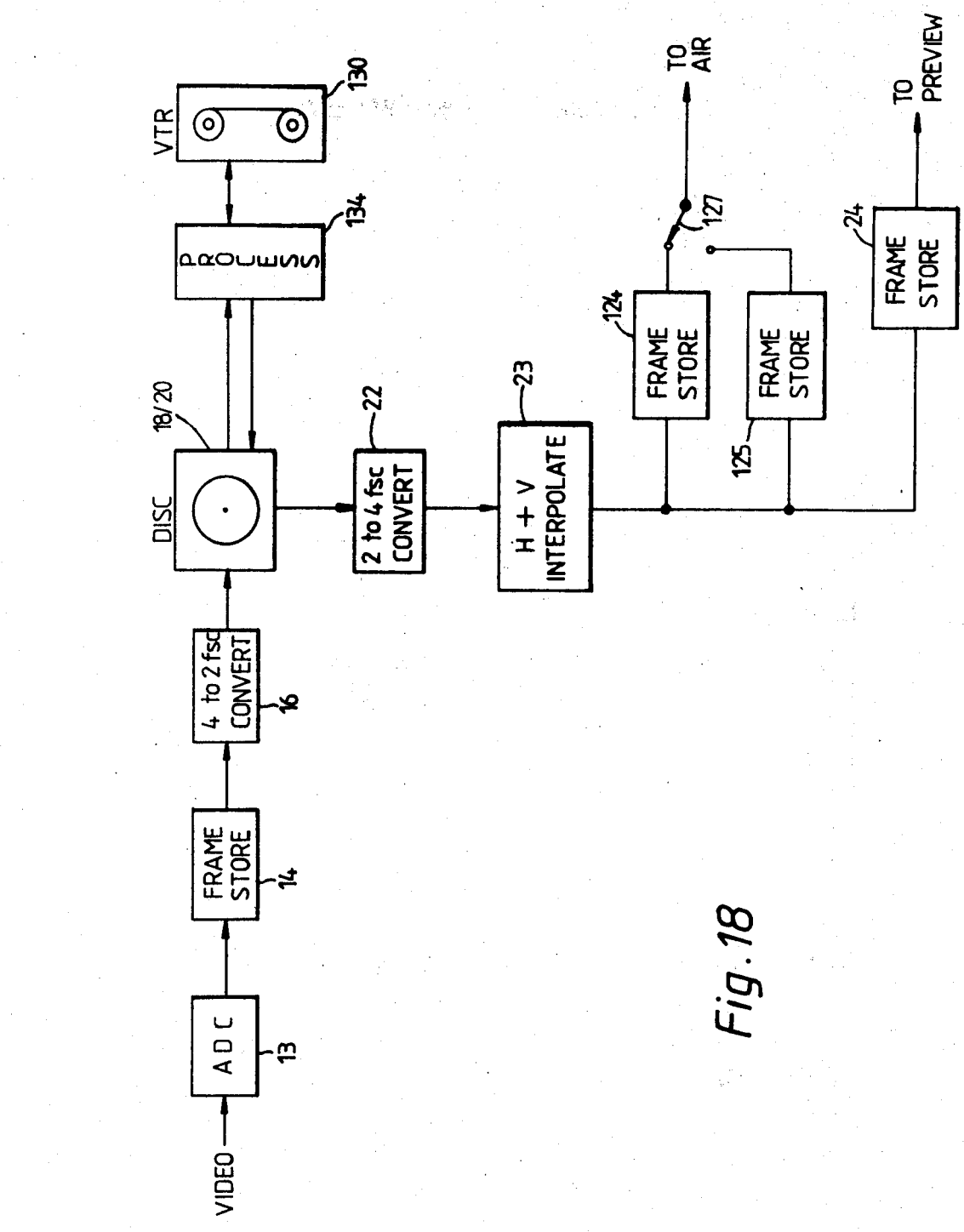
FIG. 18 shows an expanded system with the facility for data transfer to an analogue VTR and using additional frame storage for rapid switching from one picture to another.

The basic system can be expanded as shown in FIG. 18 to incorporate additional facilities. In addition to the combined system of FIGS. 4 and 5, an analogue VTR 130 is provided to allow transfer of digital data from the disc 18/20. The data from converter 16 for disc 18/20 is put into the correct digital format and the data read out from the disc for receipt by VTR 130 is formatted as required. The data passes to the VTR via processor 134 which processes the data including inserting analog sync information to allow storage of the digital data on the analogue machine and removes the sync information on playback to provide correctly formatted digital data once again as described in more detail in copending British patent application No. 7930222.

The output of interpolator 23 can be received by a number of frame stores 124, 125 for example and under the control of switch 127 a particular picture can be selected 'on air' to provide a choice of picture material. Switch 127 can be integral with the system or externally provided.

The store 24 can be used as a preview store to be used independently of the other stores 124 and 125 to provide a preview facility for example. This facility could alternatively be provided by using store 14 when available. The number of stores used could be expanded as required.

Figure 19:
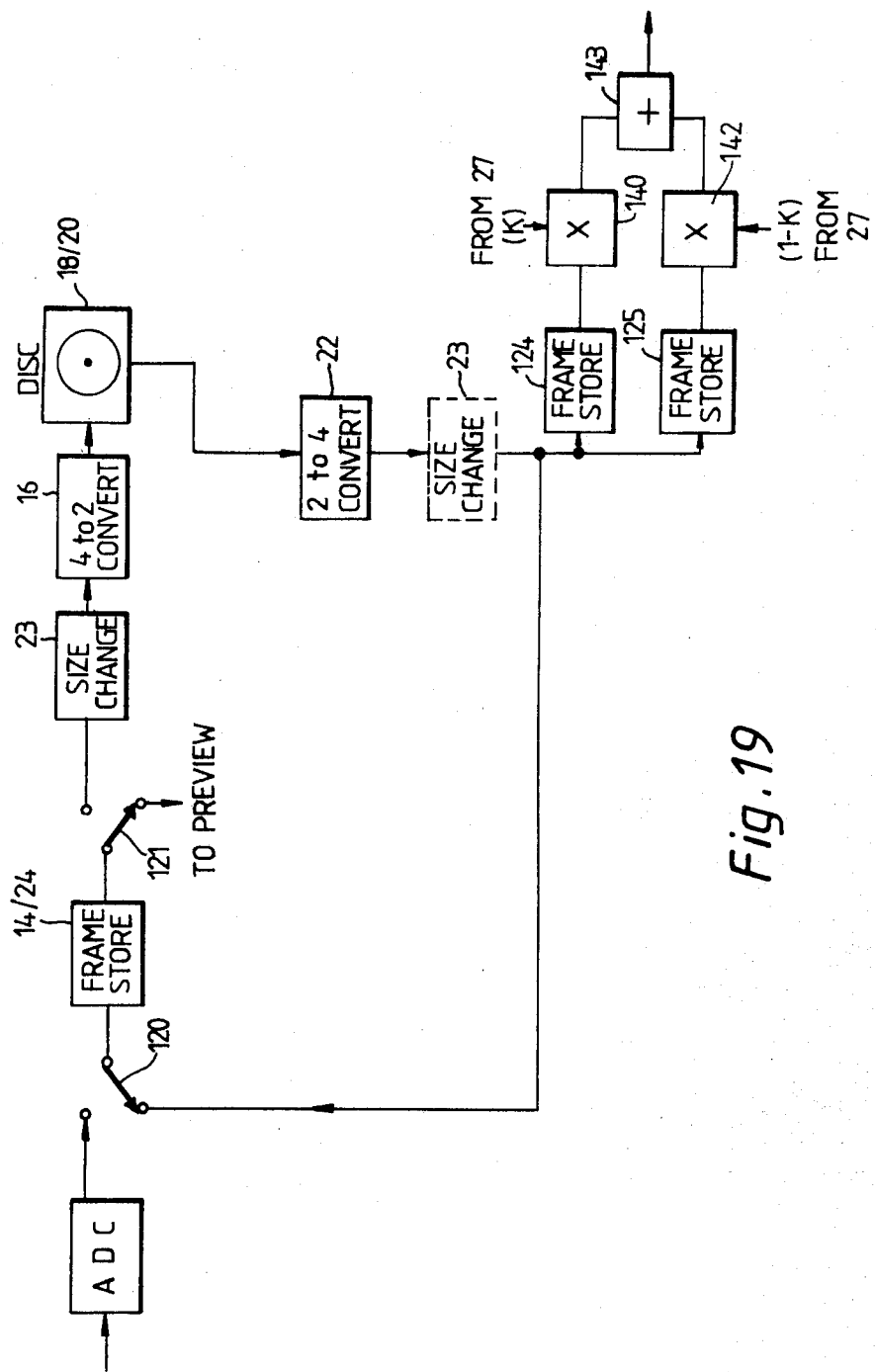
FIG. 19 shows an alternative configuration with modified facilities including fade-over.

In the alternative arrangement of FIG. 19 the frame stores 14 and 24 of FIG. 18 are shown as comprising a single store switchable under the control of switches 120 and 121 (typically solid state switching) to reduce the requirement for two stores for this function. It would also be possible to provide size change prior to converter 16 as now shown in FIG. 19 by moving the position of processor 23 to provide an increase or decrease in picture size relative to normal frame size prior to storage on disc 18 should this be desired. Further with suitable switching it would be possible to share the size change facility between input and output of the disc 18.

The stores 124 and 125 have outputs now received by multipliers 140 and 142 respectively with the multiplier outputs received by adder 143 to provide an output (replacing that provided at switch 127 output of FIG. 18). The multipliers 140 and 142 provide a fade-over facility by varying the portion of picture used from the respective stores as mentioned above concerning FIG. 3. In practice the picture output is determined by selecting a value of K (or 1−K) typically made available from control 27. The value of K is gradually increased from zero to 1 and thus (1−K) reduces from 1 to zero. When K=0 then no portion of the output of store 124 is provided at the output of adder 143 and thus the output entirely comprises the output from store 125. Thus the output system would simply act as a switch. However as K is gradually increased then the portion of the picture from store 124 is increased gradually replacing that provided from store 125.

In situations where the fade-over facility is not required it is possible by selecting K to be only zero or 1 to have a simple switching action between stores 124 and 125. The interpolation provided by block 23 has been described so far as providing a linear size change across the entire picture. In practice it is possible to vary the interpolation to provide various visual effects. In addition to normal size increase or reduction, an increasing size change of a picture frame by frame will provide a picture zoom up facility, and using the reverse technique picture zoom down is provided.

By varying the horizontal and vertical size, line by line, it is possible to create a different shape picture (i.e. non-rectangular) as described in more detail in British patent application No. 11361/77.

Figures 20, 21:
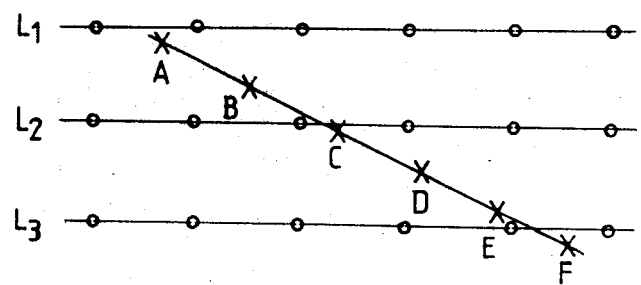
FIG. 20 shows picture rotation achieved using manipulation of the interpolation coefficients.
FIG. 21 shows the multiple display format for a number of reduced size pictures.

By combining appropriate combinations of horizontal and vertical coefficients in the interpolators, it is possible to rotate the picture which is an important feature when used with captions as for example a horizontal misalignment can be compensated by effectively rotating the caption. This is shown in FIG. 20. Actual picture point samples for lines 1, 2 and 3 are shown and the synthesised samples A, B, C, D, E and F are chosen to form the horizontal line when read out. Such a line will be seen to have been effectively rotatated.

It is possible to use a fixed degree of compression to generate a frame comprising a number of stored pictures to provide a browse or polyphoto facility as shown in FIG. 21. The pictures comprise a number of successive compressed images (e.g. 16, 25 or 36 say, as in this example) which are available for display together based on the technique already described in British patent application No. 7910113.

The pictures displayed may follow the order actually stored on the disc or alternatively can be in the order actually accessed. The picture can be made to scroll horizontally or vertically as sequential pictures are compressed to provide visual access to the entire library of pictures stored. (See also U.S. Pat. No. 4,148,070).

The multiple display of pictures is made by writing more than one compressed picture from the disc into the frame store 26. This compression can be achieved during actual disc time or alternatively achieved during compiling the library and then recorded as a new frame back onto the disc.

It is to be appreciated that the system described would be suitable for NTSC (or for PAL or SECAM) modified as required to handle that type of T.V. format.

Although the system has been described generally in relation to providing a storage system with a large number of facilities such as size change or data quantity reduction the system could be simplified to include just one of these facilities.

We claim:

1. A digital video processor system for reducing the number of digital data samples relative to that received at an input thereof by effectively reducing the data sample rate comprising:
   input processor means including a separator for receiving digital video data from spacially adjacent video lines and separating said data into high and low frequency components;
   a first adder for adding together the high frequency component from each line; and
   a second adder for adding selected portions of the video data from said first adder to selected portions of the low frequency component to provide the reduction in data therefrom by a factor of two.

2. A system according to claim 1, wherein the separator comprises first and second digital filters for respectively receiving data from one of said two adjacent video lines.

3. A system according to claim 1, including receiving means for receiving and manipulating the data at a reduced rate from said input processor means and including output processor means comprising a converter adapted to increase the number of digital data samples output from said receiving means by increasing the effective data sample rate relative to that provided at its input.

4. A system according to claim 3, wherein said converter includes a separator for receiving digital data from two spacially adjacent video lines and separating said data into high and low frequency components, a first adder for adding together the high frequency component from each line and a second adder for adding the output from said first adder with the low frequency data from said separator to provide an increase in data therefrom by a factor of two.

5. A system according to claim 4, wherein the converter includes first and second digital filters and holding means are provided prior to the second adder to hold the low frequency data component for at least one data sample period to repeat the low frequency data sample available to said second adder.

6. A system according to claim 1, wherein the input processor means is adapted to receive incoming video data at a rate of four times sub-carrier frequency and to reduce the data rate to twice sub-carrier frequency.

7. A system according to claim 3, wherein the output processor means is adapted to receive incoming video data at a rate of twice sub-carrier frequency and to increase the data rate to four times sub-carrier frequency.

8. A system according to claim 3, wherein the output processor means includes a comb filtering decoder for separating the video data into luminance and chrominance components.

9. A system according to claim 8, wherein the decoder comprises separator means for receiving digital data from two spacially adjacent video lines and for separating said data into high and low frequency components, first adder means for adding together the high and low frequency component from each line, delay means for providing a delay equivalent to one line in the same field for the high frequency component, second adder means for adding the output of said delay means to the current high frequency data to provide high frequency luminance data therefrom, third adder means for adding the high frequency luminance data to low frequency data from said separator means to provide luminance data with high and low frequency components, subtractor means for subtracting the output of said second adder means with the input to said delay means to provide chrominance information and corrector means for selectively inverting the chrominance samples to provide correctly phased chrominance data.

10. A system according to claim 4, wherein the output processor includes a decoder which receives the output of the separator and the first adder of said converter to have access to the high frequency and low frequency data at the increased data rate therefrom, and includes delay means for providing a delay equivalent to one line in the same field for the high frequency component and third adder means for adding the output of said delayed high frequency data to current high frequency data to provide high frequency luminance data therefrom, fourth adder means for adding the high frequency luminance data to low frequency data from said separator means to provide luminance data with high and low frequency components and including subtractor means for subtracting the output of said third adder with the input to said delay means to provide chrominance information and corrector means for selectively inverting the chrominance samples to provide correctly phased chrominance data.

11. A method of reducing the number of digital data samples by effectively reducing the data sample rate comprising:
   receiving video data from two spacially adjacent video lines;
   separating the received data from each line into high and low frequency components;
   adding together the high frequency component from each line;
   selecting portions of the video data from the first adding step;
   selecting portions of the low frequency component of the video data, and
   adding the selected portions of the data from the first adding step to the selected portions of the low frequency component to provide the reduction in data therefrom by a factor of two relative to that received.

12. A method according to claim 11, wherein the data quantity is increased after further manipulation to produce reconstituted data by the steps of:
   receiving data from spacially adjacent lines, separating said data into high and low frequency components,
   adding together the high frequency component from each line,
   holding the low frequency data for at least one data sample period, and
   adding the held data to the high frequency data from the first adding step to provide an increase in data by a factor of two.

* * * * *